(12) United States Patent
Kim et al.

(10) Patent No.: US 8,954,107 B2
(45) Date of Patent: Feb. 10, 2015

(54) METHOD, APPARATUS, AND SYSTEM FOR REPORTING POWER HEADROOM IN A MOBILE COMMUNICATION SYSTEM

(75) Inventors: Sang-Bum Kim, Seoul (KR); Soeng-Hun Kim, Suwon-si (KR); Kyeong-In Jeong, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 343 days.

(21) Appl. No.: 13/501,970

(22) PCT Filed: Nov. 5, 2010

(86) PCT No.: PCT/KR2010/007824
§ 371 (c)(1),
(2), (4) Date: Apr. 13, 2012

(87) PCT Pub. No.: WO2011/056028
PCT Pub. Date: May 12, 2011

(65) Prior Publication Data
US 2012/0196645 A1    Aug. 2, 2012

(30) Foreign Application Priority Data
Nov. 6, 2009  (KR) .................. 10-2009-0107237

(51) Int. Cl.
*H04B 7/00* (2006.01)
*H04W 52/36* (2009.01)

(52) U.S. Cl.
CPC ............ *H04W 52/36* (2013.01); *H04W 52/365* (2013.01); *Y02B 60/50* (2013.01)
USPC ............... 455/522; 455/69; 455/70; 370/310; 370/311; 370/312; 370/313; 370/314

(58) Field of Classification Search
USPC ...................... 455/522, 69–70; 370/310–320
See application file for complete search history.

(56) References Cited

U.S. PATENT DOCUMENTS 8,570,957 B2 *  10/2013  Ball et al. ................ 370/329
2004/0147276 A1  7/2004  Gholmieh et al.
(Continued)

FOREIGN PATENT DOCUMENTS

| CN | 101479980 A | 7/2009 |
|----|-------------|--------|
| WO | 2008/155469 A1 | 12/2008 |

OTHER PUBLICATIONS

Samsung, "UL Transmission Power Control in LTE-A", 3GPP TSG RAN WG1 #57bis, R1-092670, Jun. 29-Jul. 3, 2009.
(Continued)

*Primary Examiner* — Fayyaz Alam
(74) *Attorney, Agent, or Firm* — Jefferson IP Law, LLP

(57) ABSTRACT

A method, apparatus, and system for efficiently reporting Power Headroom (PH) for optimizing uplink coverage are provided. A method in which user equipment reports power headroom in a mobile communication system includes receiving Power Headroom Report (PHR) configuration information including a PH threshold value from a first base station, determining whether to perform a PHR trigger by comparing the PH value, which indicates the available transmission power of the user equipment, with the PH threshold value, and, when the PH value is less than the PH threshold value, transmitting, to the first base station, PHR-related report information including information corresponding to an influence caused by the scheduling of the first base station.

22 Claims, 10 Drawing Sheets

(56) References Cited

U.S. PATENT DOCUMENTS

| | | |
|---|---|---|
| 2008/0095263 A1 | 4/2008 | Xu et al. |
| 2009/0238136 A1 | 9/2009 | Sambhwani et al. |
| 2009/0245191 A1* | 10/2009 | Ball et al. .................. 370/329 |
| 2012/0046064 A1* | 2/2012 | Baldemair et al. ............ 455/522 |

OTHER PUBLICATIONS

Nokia Siemens Networks, "PUSCH Power Control for LTE-Advanced", 3GPP TSG RAN WG1 #57bis, R1-092574, Jun. 29-Jul. 3, 2009.

3GPP TSG-RAN2#63BIS Meeting; Correction on PHR triggering condition; R2-085835; Change Request Version 8.3.0; Sep. 29-Oct. 3, 2008; Prague, The Czech Republic.

3GPP TSG-RAN2#63BIS Meeting; Correction on PHR triggering condition; R2-085945; Change Request Version 8.3.0; Sep. 29-Oct. 3, 2008; Prague, The Czech Republic.

3GPP TSG-RAN Working Group 2 Meeting #64; Report of 3GPP TSG RAN WG2 meeting #63bis; R2-087432; ETSI MCC; Nov. 10-14, 2008; Prague, The Czech Republic.

* cited by examiner

METHOD, APPARATUS, AND SYSTEM FOR REPORTING POWER HEADROOM IN A MOBILE COMMUNICATION SYSTEM

PRIORITY

This application is a National Stage application under 35 U.S.C. §371 of an International application filed on Nov. 5, 2010 and assigned application No. PCT/KR2010/007824, and claims the benefit under 35 U.S.C. §365(b) of a Korean patent application filed in the Korean Industrial Property Office on Nov. 6, 2009 and assigned Ser. No. 10-2009-0107237, the entire disclosure of which is hereby incorporated by reference.

BACKGROUND OF THE INVENTION

1. Field of the Invention

The present invention relates to a method, apparatus, and system for reporting Power Headroom (PH) in a mobile communication system. More particularly, the present invention relates to a method, apparatus, and system for efficiently reporting PH in order to optimize uplink coverage in a mobile communication system.

2. Description of the Related Art

Mobile communication systems were originally developed for the purpose of providing communication while ensuring the mobility of users. With the rapid progress of technology, mobile communication systems are now able to provide high-speed data communication, as well as voice communication.

As a next generation mobile communication system, Long Term Evolution (LTE) is under standardization by the 3rd Generation Partnership Project (3GPP). LTE is a technology for implementing high-speed packet-based communication of about 100 Mbps, which is higher than data rates provided by previous mobile communication systems.

With the evolution of the LTE standard, methods of optimizing a wireless network are under discussion. In general, radio environment information must be collected when a wireless network is optimized. Conventional schemes for collecting radio environment information are troublesome in that measuring equipment needs to be carried in an automobile, and measuring tasks have to be performed over a long period of time. Also, the measured result of radio environment information passes through an analysis process, and then is used to set the system parameters of each base station or base station controller. This results in an increase in wireless network optimization and operation costs, and requires a significant amount of time. Accordingly, research that is referred to as Minimization of Driving Test (MDT) is being conducted to minimize drive test work and improve an analysis process and manual setting when radio environment information is collected. To this end, instead of drive test work, a User Equipment (UE) transfers necessary information to a base station when a specific event occurs. In an area where the UE is able to communicate with the base station, the UE may immediately send the information to the base station. In an area outside of the coverage of the base station, the UE stores the information and then reports the stored information when communication is enabled later on. The base station uses the received information for cell coverage optimization.

The cell coverage optimization is the main issue of MDT. With regard to the cell coverage optimization, the following UE measurement elements are under discussion by the 3GPP standard conference:

(1) Periodic downlink pilot measurements
(2) Serving cell becomes worse than threshold
(3) Transmit power headroom becomes less than threshold
(4) Paging channel failure (PCCH decode error)
(5) Broadcast channel failure Among these UE measurement elements, measurement elements (1), (2), (4), and (5) are provided for downlink cell coverage optimization, and measurement element (3) is used to optimize uplink cell coverage.

LTE systems employ adaptive modulation and coding techniques that determine modulation schemes and channel coding rates adaptive to channel conditions. In order to perform an operation of allocating transmission resources to UEs, that is, scheduling, a base station receives reports of various scheduling information from the UEs. An example of this scheduling information includes Power Headroom (PH) that is information on available UE transmit power.

The PH in measurement element (3) represents available UE transmit power, that is, a difference between the maximum UE transmit power and transmit power required by a base station. Detailed measurement information for a Power Headroom Report (PHR), through which a UE reports a PH value to a base station, in the conventional MDT technique is summarized below in Table 1. A PHR event is triggered when a PH value is less than a specific threshold. The corresponding threshold may be provided to a UE in advance by a base station, or may be specified in the standard. If a PHR event is triggered, then a UE measures and logs related information within a specific time period. Here, the logged information includes a UE location and a logging time, a cell ID (e.g., a Cell Global Identifier (CGI), a Physical Cell Identifier (PCI), etc.), UE transmit power, and other radio environment measurement information.

TABLE 1

Trigger type: Transmit power headroom becomes less than threshold
Triggered when UE transmit power headroom becomes less than the preconfigured threshold
Configuration parameter(s):
Threshold
Measurement logging window
Measurement logging interval (within the measurement logging window)

| Measurement | Definition | Remarks |
|---|---|---|
| Location info | Location at which concerned trigger took place | |
| | Location at which concerned measurements took place | |
| Time info | Time at which concerned trigger took place | |
| | Time at which concerned measurements took place | |
| Cell Identification | CGI of the serving cell at which concerned trigger took place | |
| | PCI of other cells for which measurements are logged | |
| UE transmit power info | UE transmit power | |
| Radio environment measurement | Cell measurements that are available at the trigger | |
| | Cell measurements that are available during a certain period before and after the occurrence of concerned trigger | |

The PH is used to detect uplink channel conditions and UE transmit power margins. When channel conditions are poor, UE transmit power is increased and a PH value is decreased. Even though channel conditions are good, a PF value is also decreased if many channel resources are allocated to a UE and thus the consumed UE transmit power is increased. Therefore, in order to make it possible to accurately optimize uplink cell coverage, a base station must be able to determine the reason why a PH value is small. Since the general purpose of performing a PHR in MDT is to detect uplink channel conditions, it is necessary to identify a UE transmit power increase resulting from heavy scheduling.

In the conventional MDT technique, if PH becomes less than a specific threshold, then a UE transmits PHR-related report information including the measurement information as given in Table 1 to a base station. In an area where the UE is able to communicate with the base station, the UE may immediately send the PHR-related report information to the base station. In an area outside of the coverage of the base station, the UE stores the PHR-related report information and then reports the stored information when communication is enabled later on. When the UE stores the PHR-related report information, it stores a UE location, time information, a serving base station ID at the time of storing the PHR-related report information, and the like, along with UE transmit power information. However, with only such conventional PHR-related report information, it is difficult to identify whether a decrease in PH value is caused by heavy scheduling or is due to channel conditions.

Therefore, a need exists for a system and method for efficiently reporting PH in order to optimize uplink coverage in a mobile communication system.

SUMMARY OF THE INVENTION

Aspects of the present invention are to address at least the above-mentioned problems and/or disadvantages and to provide at least the advantages described below. Accordingly, an aspect of the present invention is to provide a method, apparatus, and system for efficiently reporting Power Headroom (PH) in order to optimize uplink coverage in a mobile communication system.

Another aspect of the present invention is to provide a method, apparatus, and system for reporting PH in a mobile communication system, which can prevent a Power Headroom Report (PHR) from being caused by heavy scheduling.

In accordance with an aspect of the present invention, a method for reporting PH by a User Equipment (UE) in a mobile communication system is provided. The method includes receiving PHR configuration information including a PH threshold from a first base station, determining whether to perform a PHR trigger by comparing a PH value indicating available transmit power of the UE with the PH threshold, and, when the PH value is less than the PH threshold, transmitting PHR-related report information, including information corresponding to an influence caused by scheduling of the first base station, to the first base station.

In accordance with another aspect of the present invention, a UE configured to report PH to a first base station in a mobile communication system is provided. The UE includes a receiver for receiving PHR configuration information including a PH threshold from the first base station, a transmitter for transmitting PHR-related report information to the first base station, and a controller for determining whether to perform a PHR trigger by comparing a PH value indicating available transmit power of the UE with the PH threshold, and for controlling transmitting the PHR-related report information, including information corresponding to an influence caused by scheduling of the first base station, to the first base station when the PH value is less than the PH threshold.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
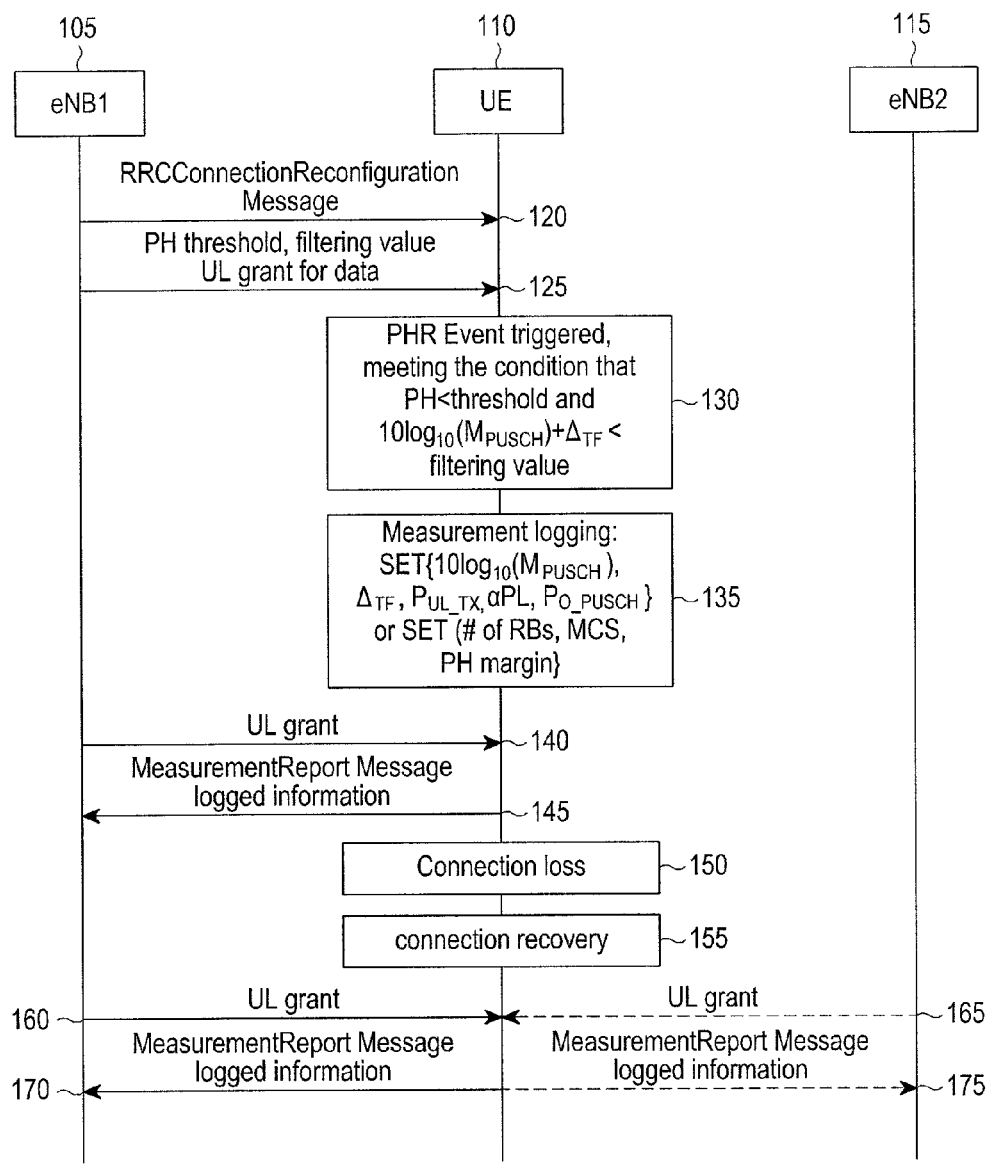
FIG. 1 is a flow diagram illustrating a method for reporting Power Headroom (PH) in a mobile communication system according to a first exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention relate to a method and apparatus for storing Power Headroom (PH) measurement information when the PH of a User Equipment (UE) is decreased to less than a specific threshold and reporting the stored PH measurement information to a base station to automatically optimize transmission-related parameters in order to optimize uplink coverage in a mobile communication system. An exemplary embodiment of the present invention proposes a UE's operation with regard to a point of time when a UE is to store the PH measurement information for a Power Headroom Report (PHR) and PHR-related report information to be stored by a UE.

As described above, PH may become less than a specific threshold depending on channel conditions or due to heavy scheduling. Accordingly, in order to accurately predict channel conditions by using a PHR, it is necessary to prevent a PHR from being caused by heavy scheduling. In the case of employing the conventional technique, it is impossible to identify whether a PHR results from channel conditions or heavy scheduling, and a PHR will be performed regardless of the reason of its occurrence. An exemplary embodiment of the present invention proposes a way to intercept a PHR resulting from heavy scheduling in order to prevent a PHR from being caused by heavy scheduling.

In a first exemplary embodiment of the present invention as described below, a new trigger condition is proposed to prevent a PHR from being caused by heavy scheduling. In a second exemplary embodiment of the present invention, a virtual PH is proposed, and reflecting the influence of scheduling is allowed by comparing the PH with a threshold. Further, in a third exemplary embodiment of the present invention, a method is proposed to determine a PHR trigger on the assumption that a UE is allocated a predetermined number of Resource Blocks (RBs) and a predetermined Modulation and Coding Scheme (MCS).

First, a mobile communication system to which an exemplary embodiment of the present invention is applied will be described with reference to FIG. 10.

Figure 10:
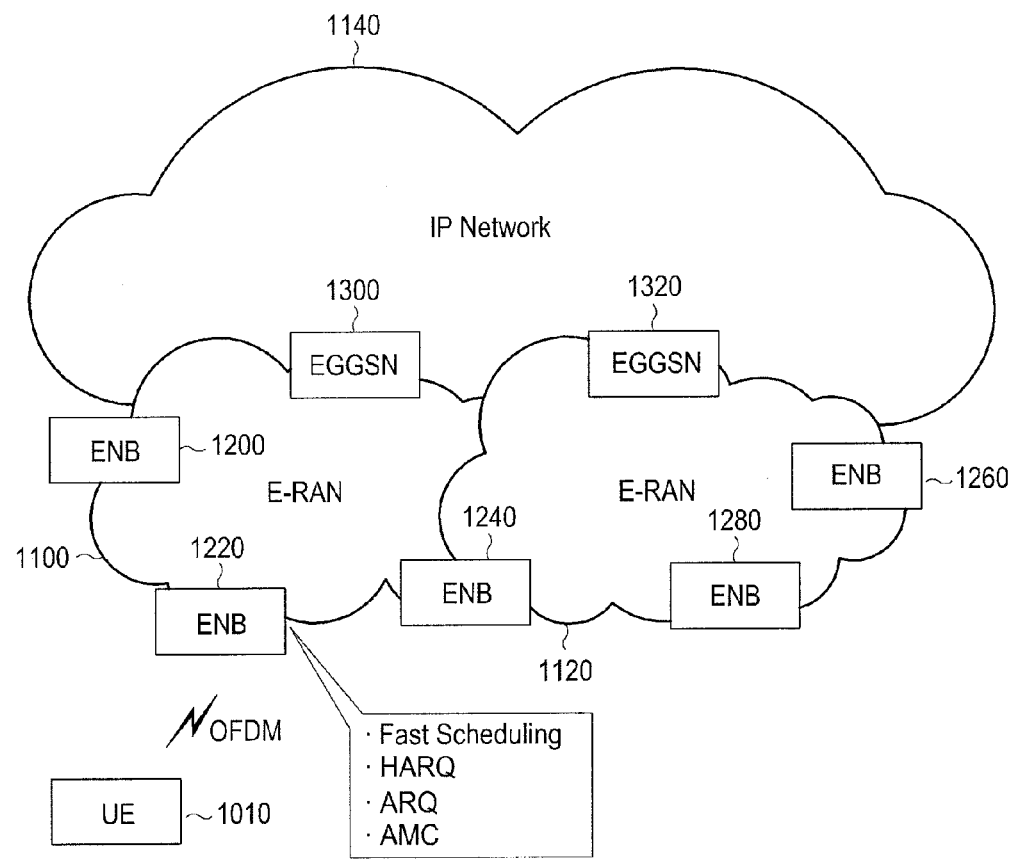
FIG. 10 is a view schematically illustrating a configuration of a Long Term Evolution (LTE) system as a mobile communication system to according to an exemplary embodiment of the present.

FIG. 10 is a view schematically illustrating a configuration of a Long Term Evolution (LTE) system as a mobile communication system to according to an exemplary embodiment of the present.

Referring to FIG. 10, Evolved Radio Access Networks (E-RANs) 1100, 1120 each has a simplified two node structure of an evolved Node B (ENB or eNB) 1200, 1220, 1240, 1260, 1280 and an anchor node (referred to as "access gateway") 1300, 1320. A UE 1010 is connected to an Internet Protocol (IP) network 1140 via one of the E-RANs 1100, 1120. The eNBs 1200 to 1280 correspond to an existing Node B of the Universal Mobile Telecommunications System (UMTS). In FIG. 10, one of the eNBs 1200 to 1280 is connected to the UE 1010 over a radio channel, and performs more complex functions than the existing node B. Since all user traffic including a real-time service through an IP, such as a Voice Over IP (VoIP) service, is serviced via a shared channel in LTE, there is a need for an apparatus for collecting status information including a PHR from UEs and performing scheduling. In an exemplary embodiment, each of the eNBs 1200 to 1280 serves as such an apparatus.

The UE and the eNBs of FIG. 10 perform a PHR procedure, which restricts a PHR trigger resulting from heavy scheduling, according to first to third exemplary embodiments of the present invention as described below.

In the following first to third exemplary embodiments of the present invention, a description will be given of a method to store PH measurement information when the PH of a UE is decreased to less than a specific threshold and report the stored PH measurement information to an eNB to automatically optimize transmission-related parameters in order to optimize uplink coverage in, for example, an LTE mobile communication system, and a UE's operation with regard to a point of time when a UE is to store specific information for a PHR and information to be stored by a UE.

[Embodiment 1]

In the first exemplary embodiment of the present invention, a filtering value for filtering a PHR is introduced to prevent a PHR from being unnecessarily triggered by heavy scheduling. The transmit power $P_{PUSCH}$ of a Physical Uplink SHared Channel (PUSCH) used for uplink data transmission is defined as follows. For a description of each parameter, see 3rd Generation Partnership Project (3GPP) TS36.213.

$$P_{PUSCH}(i)=\min\{P_{MAX},10\log_{10}(M_{PUSCH}(i))+ P_{O\_PUSCH}(j)+\alpha(j)\cdot PL+\Delta_{TF}(i)+f(i)\}[\text{dBm}] \quad (1)$$

In Equation (1), $M_{PUSCH}$ denotes the number of RBs allocated to a corresponding UE, and $\Delta_{TF}$ denotes a transmit power margin value additionally required for each MCS.

In Equation (1), parameters that are affected by scheduling correspond to the number of RBs allocated to a corresponding UE, that is, $M_{PUSCH}$, and a transmit power margin value additionally required for each MCS, that is, $\Delta_{TF}$. Accordingly, in addition to the existing condition that PH is less than a specific threshold, the following second condition must also be considered.

$$10\log_{10}M_{PUSCH}+\Delta_{TF}<\text{filtering value} \quad (2)$$

The condition that the sum of the logarithmic value of the number of RBs allocated to a corresponding UE in an uplink PUSCH used for data transmission ($M_{PUSCH}$) that is, $10\log_{10}M_{PUSCH}$, and a transmit power margin value additionally required for each MCS, that is, $\Delta_{TF}$, is less than a specific filtering value is considered together with the condition that PH is less than a specific threshold, and a PHR is triggered when these two conditions are satisfied. In an exemplary embodiment of the present invention, it is assumed that the filtering value for filtering a PHR trigger is transmitted from an eNB to a UE. In another exemplary embodiment of the present invention, a value empirically predetermined such that a PHR is prevented from being caused by heavy scheduling may be used as the filtering value for filtering a PHR trigger.

Equation (2) reflects the fact that the transmit power of a UE may be affected by allocated resources and an MCS, as well as channel conditions. When a UE is allocated many radio resources or an MCS level is high, the second condition of Equation (2) may not be satisfied, and thus an unnecessary PHR trigger is restricted by the second condition of Equation (2). In an exemplary embodiment of the present invention, if the above two conditions are satisfied and consequently a PHR is triggered, a UE logs, for example, the following information in addition to the conventional PHR-related report information as presented in Table 1, and transmits PHR-related report information including the logged additional information to an eNB.

Additional Information $10 \log_{10}(M_{PUSCH})_i \Delta_{TF_i} \alpha \cdot PL_i P_{O\_PUSCH} \cdot f$ and/or no. of RBs, MCS level, PH value Regarding the additional information, α is a path loss compensation factor, which is a 3-bit cell-specific parameter determined in consideration of an uplink capacity, a cell edge data rate, and the like, and having a value of 0 to 1. Also, PL is a path loss value, $P_{O\_PUSCH}$ is used as an operation point for power calculation, and f is a parameter for close loop power control. In an exemplary embodiment of the present invention, since this PHR-related report information includes scheduling information of a UE, as well as a PH value, an eNB uses the received PHR-related report information for coverage optimization work. For example, an eNB can find how much the transmit power of a UE is affected by the number of RBs and an MCS level, based on the $M_{PUSCH}$ and $\Delta_{TF}$ values. Accordingly, based on the additional information, an eNB can determine if a PHR trigger results from heavy scheduling.

Further, in an exemplary embodiment of the present invention, a UE may transmit PHR-related report information including additional information, such as the number of RBs, an MCS level, and a pH value, to an eNB through a PHR. In another exemplary embodiment of the present invention, a UE may transmit PHR-related report information including all or at least one of $10 \log_{10}(M_{PUSCH})_i \Delta_{TF_i} \alpha \cdot PL_i P_{O_{PUSCH}} \cdot f$, the number of RBs, an MCS level, and a PH value as additional information to an eNB.

Although it is assumed in the above exemplary embodiment of the present invention that additional information is included in PHR-related report information and the PHR-related report information including the additional information is transmitted to an eNB, it is possible in another exemplary embodiment of the present invention to transmit additional information to an eNB through a separate message.

Based on such PHR-related report information, an eNB can analyze the transmit power of a UE. That is, an eNB can determine the current transmit power of a UE through a PH value, and can analyze the corresponding transmit power in consideration of the number of RBs and an MCS level. Using this PHR-related report information, an eNB determines if a point where a UE triggers a PHR shows reception performance sufficient for uplink coverage. In the first exemplary embodiment of the present invention, since an eNB is informed of the above additional information when PHR-related information is transmitted thereto, log information is increased as compared to the conventional technique. Here, the log information denotes PHR-related report information that a UE transmits to an eNB through a PHR.

FIG. 1 illustrates a method for reporting PH in a mobile communication system according to the first exemplary embodiment of the present invention.

Referring to FIG. 1, in step 120, an eNB 105 transmits PHR-related configuration information to a UE 110. The PHR-related configuration information may be transmitted via an RRCConnectionReconfiguration message, which includes a PH threshold and a filtering value for restricting an unnecessary PHR. In step 125, the eNB 105 allocates radio resources for data transmission to the UE 110. In step 130, the UE 110 monitors if a difference between its maximum transmit power and uplink transmit power (i.e., available transmit power) is less than the PH threshold.

The UE 110 also determines if the value of $10 \log_{10} M_{PUSCH} + \Delta_{TF}$ is less than the filtering value. When both the conditions are satisfied, the UE logs the above-mentioned PHR-related measurement information in step 135, and reports it to the eNB 105 through a PHR. When the UE 110 can immediately report the logged information to the eNB 105, it receives an UpLink grant (UL grant) from the eNB 105 in step 140, and transmits the corresponding PHR-related information to the eNB 105 over a PUSCH in step 145. Here, the PHR-related report information may include additional information as mentioned above, and the additional information may be separately transmitted to the eNB 105.

The PHR-related report information may be transmitted through a MeasurementReport message, and it is also possible to consider reporting the PHR-related report information through the existing Media Access Control (MAC) Control Element (CE). When the UE 110 cannot immediately report the PHR-related report information to the eNB 105 due to a connection loss in step 150, it may store the PHR-related report information until it is connected to the eNB 105 after a certain time elapses. If a connection to the eNB 105 is recovered in step 155, the UE 110 receives a UL grant from the eNB 105 in step 160, and transmits the logged PHR-related report information to the eNB 105 in step 170. Even when the UE 110 is connected to an eNB 115 other than the eNB 105 at the time to log the PHR-related report information, it may report the PHR-related report information to the eNB 115 through a MeasurementReport message after receiving a UL grant from the eNB 110 in steps 165 and 175. Since the PHR-related information list presented in the conventional technique includes the cell ID of a corresponding eNB, the cell ID may be used to deliver PHR-related report information to the corresponding eNB. That is, upon receiving the PHR-related report information, the eNB 115 may determine the cell ID and deliver the received PHR-related report information to the corresponding eNB 105.

Figure 2:
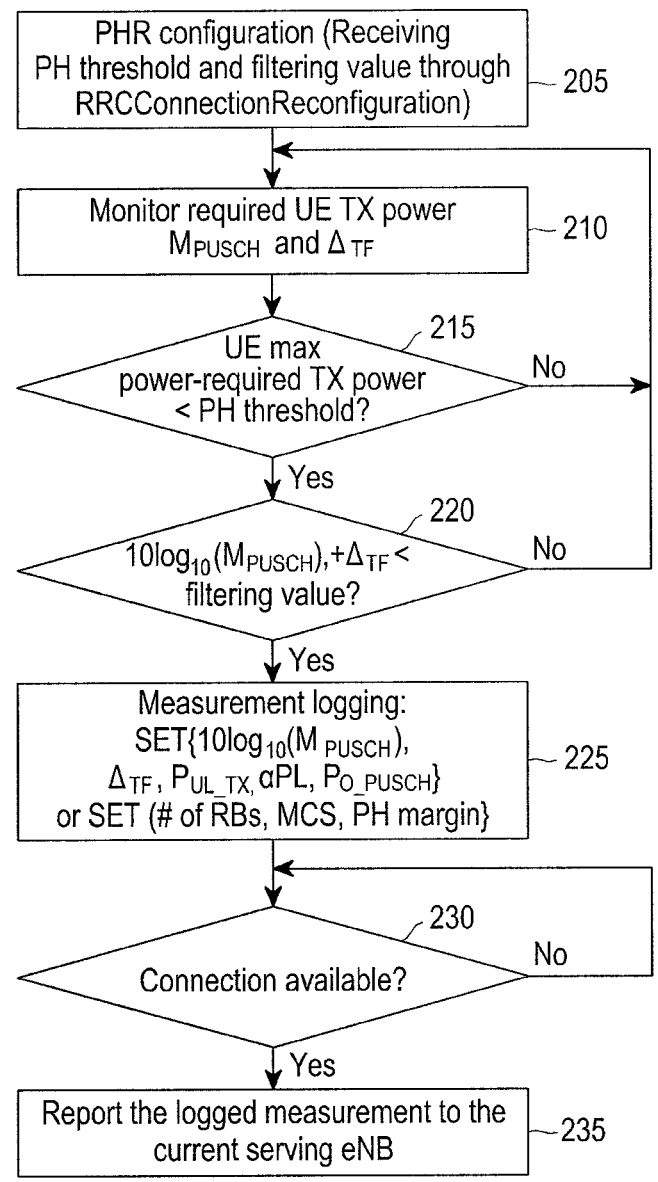
FIG. 2 is a flowchart illustrating a method for reporting PH in a mobile communication system according to the first exemplary embodiment of the present invention.

FIG. 2 is a flowchart illustrating a method for reporting PH in a mobile communication system according to the first exemplary embodiment of the present invention.

Referring to FIG. 2, in step 205, a UE receives PHR-related configuration information from an eNB. This information includes a PH threshold and a filtering value, and may be provided using an RRCConnectionReconfiguration message. In step 210, the UE transmits data by using radio resources allocated from the eNB, and performs tracking of required UE transmit power, the number of RBs, an MCS, and the like. In step 215, the UE determines if a difference between its maximum transmit power and uplink transmit power (i.e., available transmit power) is less than the PH threshold. In step 220, the UE determines if the sum of the logarithmic value of the number of RBs allocated to the UE and an MCS level is less than the filtering value. When both the conditions are satisfied, the UE logs the above-mentioned measurement information in PHR-related report information, and reports the PHR-related report information to the eNB in step 225. Subsequently, the UE determines in step 230 if a connection to the eNB is available, and, when the connection is available, transmits the logged PHR-related to the current serving eNB in step 235. Here, the PHR-related report information may include additional information as mentioned above, and the additional information may be separately transmitted to the eNB 105.

Figure 3:
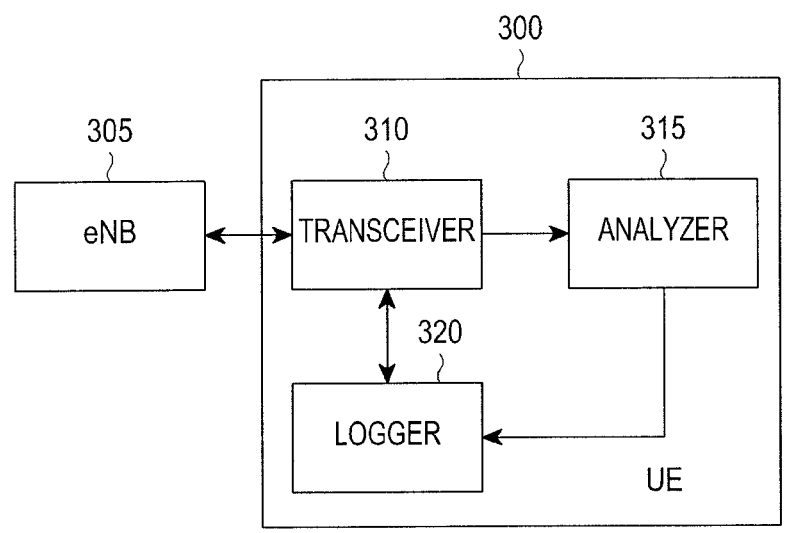
FIG. 3 is a block diagram illustrating a structure of a User Equipment (UE) configured to perform a method for reporting PH in a mobile communication system according to the first exemplary embodiment of the present invention.

FIG. 3 is a block diagram illustrating a structure of a UE configured to perform a method for reporting PH in a mobile communication system according to the first exemplary embodiment of the present invention.

Referring to FIG. 3, an eNB 305 transmits PHR-related configuration information to the UE 300. The UE 300 receives an RRCConnectionReconfiguration message including the PHR-related configuration information through a transceiver 310. Using the transceiver 310, the UE 300 transmits and receives data, and informs an analyzer 315 of required transmit power, the number of RBs allocated thereto, and an MCS level. In addition, the analyzer 315 determines whether to trigger a PHR by using a PH threshold and a filtering value included in the PHR-related configuration information. When the trigger conditions according to Equations (1) and (2) are satisfied, the analyzer 315 instructs a logger 320 to log PHR-related report information. If a connection to the eNB 305 is available and the time to report the logged information is determined, the transceiver 310 receives the PHR-related report information from the logger 320, and transmits the received PHR-related report information to the eNB 305. Here, the analyzer 315 and the logger 320 may be implemented by one controller.

[Embodiment 2]

In the second exemplary embodiment of the present invention, the concept of virtual PH is introduced to prevent a PHR from being unnecessarily caused by heavy scheduling. In this exemplary embodiment, the actual PH measured in a UE is not compared with a specific PH threshold, but virtual PH taking the influence of scheduling into consideration is determined in advance and the determined virtual PH is compared with a specific PH threshold. Here, the specific PH threshold may be transmitted from an eNB, or a predetermined value may be used as the specific PH threshold. This exemplary method is characterized in that log information can be prevented from increasing in amount as in the first exemplary embodiment of the present invention. Virtual PH is determined as a function using at least one of PH actually measured by a UE, the number of RBs allocated to a UE, and an MCS level. A UE determines virtual PH through a predefined function expression or table that may be provided from an eNB, or a value prescribed by the standard may be used as virtual PH.

This virtual PH can be said to be a PH value obtained by normalizing the influences of the number of RBs and an MCS level. A UE compares virtual PH, which is determined using the actual PH value, the number of RBs allocated thereto, and an MCS level as input values, with a PH threshold provided from an eNB, and triggers a PHR when the virtual PH is less than the PH threshold value. The UE transmits a PH margin with the virtual PH reflected therein, as well as the measurement information presented in the conventional technique, to the eNB.

Figure 4:
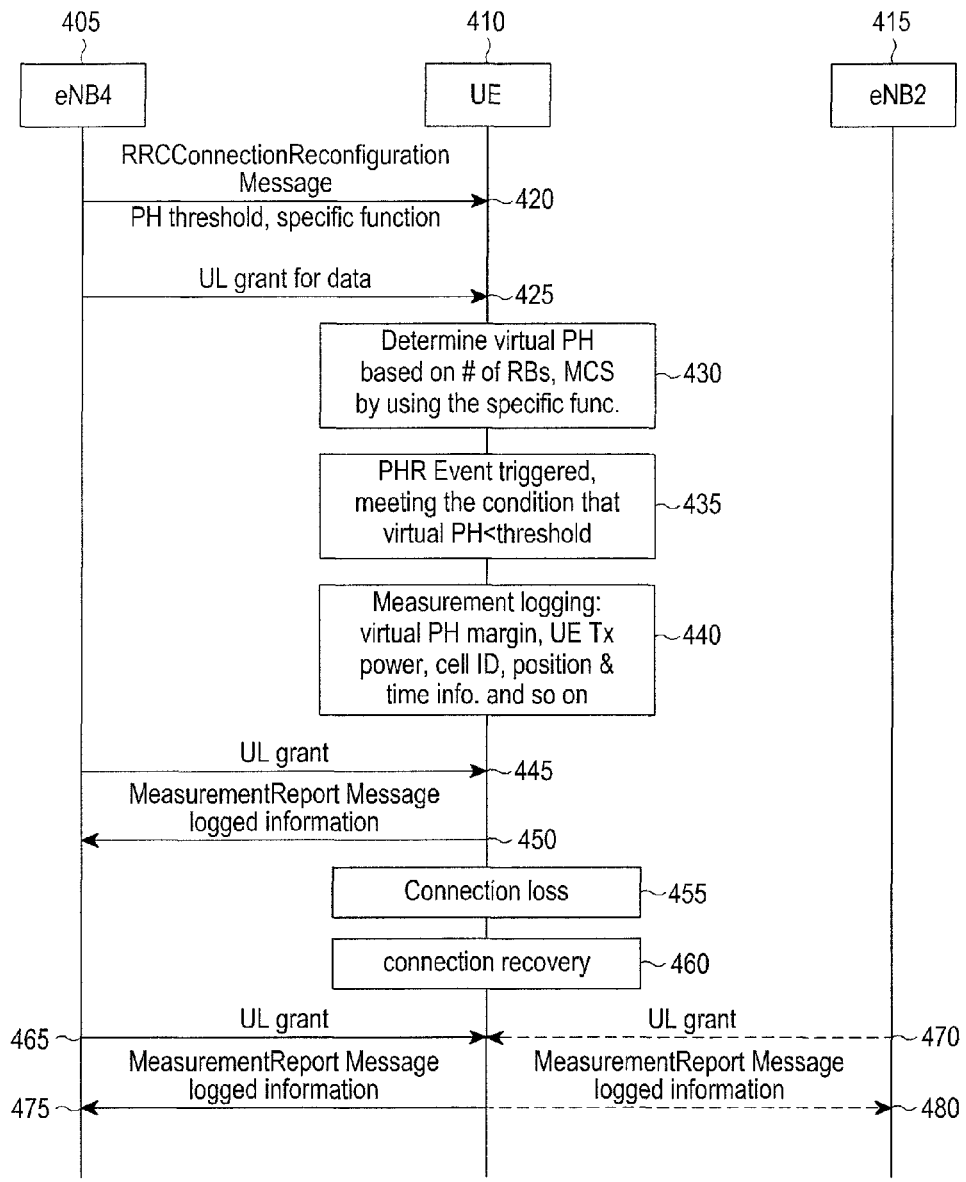
FIG. 4 is a flow diagram illustrating a method for reporting PH in a mobile communication system according to a second exemplary embodiment of the present invention.

FIG. 4 is a flow diagram illustrating a method for reporting PH in a mobile communication system according to the second exemplary embodiment of the present invention.

Referring to FIG. 4, in step 420, an eNB 405 transmits PHR-related configuration information to a UE 410. The PHR-related configuration information may be transmitted through an RRCConnectionReconfiguration message, which includes a PH threshold and a function expression, a look-up table, or the like necessary for virtual PH calculation. In step 425, the eNB 405 allocates radio resources to the UE 110, and the UE 410 transmits data by using the allocated radio resources. In step 430, the UE 410 monitors its transmit power, the number of RBs allocated thereto, and an MCS level, and determines a difference between its maximum transmit power and required transmit power (i.e., available transmit power) to derive the actual PH. Further, the UE 410 determines virtual PH by using the actual PH value, the number of RBs allocated thereto, and the MCS level as input values. In step 435, the UE 410 monitors if the virtual PH is less than the PH threshold. When the condition in step 435 is satisfied, in steps 440 to 450, the UE 410 logs the above-mentioned measurement information in PHR-related report information, and reports the PHR-related report information to the eNB 405. When the UE 410 can immediately report the PHR-related report information to the eNB 405, it receives a UL grant from the eNB 405 in step 445, and transmits the corresponding PHR-related information to the eNB 405 over a PUSCH in step 450. The PHR-related report information may be transmitted through a MeasurementReport message, and it is also possible to consider reporting the PHR-related report information through the existing MAC CE. When the UE 410 cannot immediately report the PHR-related report information to the eNB 405 due to a connection loss in step 455, it may store the PHR-related report information until it is connected to the eNB 405 after a certain time elapses. If a connection to the eNB 405 is recovered in step 460, the UE 410 transmits the logged PHR-related report information to the eNB 405 in steps 465 and 475. Even when the UE 410 is connected to an eNB 415 other than the eNB 405 at the time to log the PHR-related report information, it may report the PHR-related report information to the eNB 415 in steps 470 and 480. Since the PHR-related information list presented in the conventional technique includes the cell ID of a corresponding eNB, the cell ID may be used to deliver PHR-related report information to the corresponding eNB. That is, upon receiving the PHR-related report information, the eNB 415 may determine the cell ID and deliver the received PHR-related report information to the corresponding eNB 405.

Figure 5:
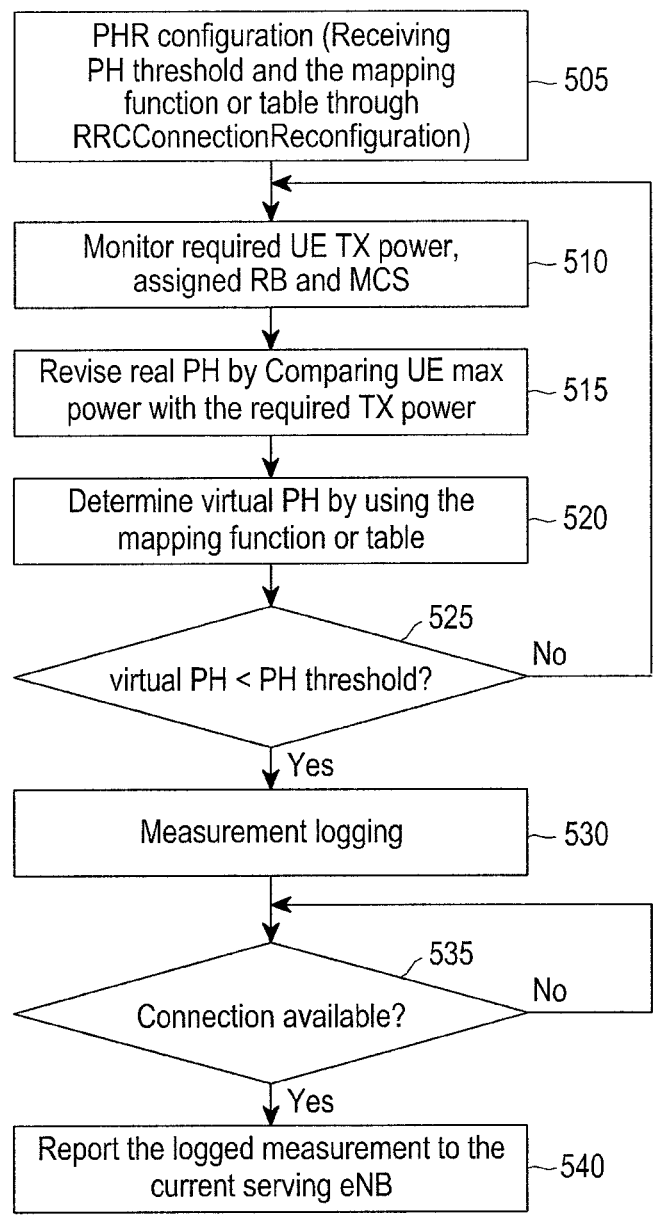
FIG. 5 is a flowchart illustrating a method for reporting PH in a mobile communication system according to the second exemplary embodiment of the present invention.

FIG. 5 is a flowchart illustrating a method for reporting PH in a mobile communication system according to the second exemplary embodiment of the present invention.

Referring to FIG. 5, in step 505, the UE receives PHR-related configuration information from an eNB. This information includes a PH threshold and a function expression, a look-up table, or the like necessary for virtual PH determination, and may be provided using an RRCConnectionReconfiguration message. In step 510, the UE monitors required UE transmit power, the number of RBs, an MCS, and the like. In step 515, the UE compares its maximum transmit power with required uplink transmit power to determine the actual PH value. In step 520, the UE determines virtual PH from the actual PH value, the number of RBs, and the MCS by using the function expression or a look-up table. In step 525, the UE determines if the virtual PH is less than the PH threshold. When the condition in step 525 is satisfied, in steps 530 to 540, the UE logs measurement information, which includes a PH margin value with the virtual PH reflected therein, in PHR-related report information, and reports the PHR-related report information to the eNB. With regard to this, the UE determines in step 535 if a connection to the eNB is available, and, when the connection is available, transmits the logged PHR-related to the current serving eNB in step 540.

Figure 6:
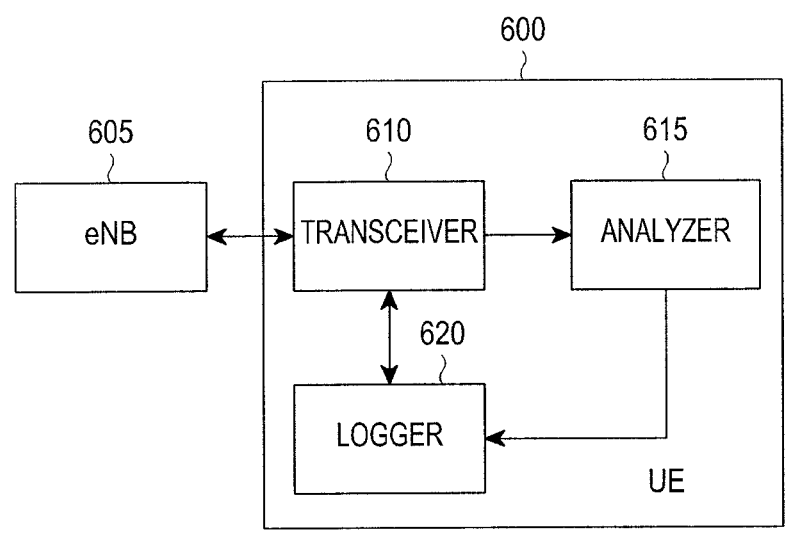
FIG. 6 is a block diagram illustrating a structure of a UE configured to perform a method for reporting PH in a mobile communication system according to the second exemplary embodiment of the present invention.

FIG. 6 is a block diagram illustrating a structure of a UE configured to perform a method for reporting PH in a mobile communication system according to the second exemplary embodiment of the present invention.

Referring to FIG. 6, an eNB 605 transmits PHR-related configuration information to the UE 600. The UE 600 receives an RRCConnectionReconfiguration message including the PHR-related configuration information through a transceiver 610. Using the transceiver 610, the UE 600 transmits and receives data, and informs an analyzer 615 of required transmit power, the number of RBs allocated thereto, and an MCS level. The analyzer 615 derives the actual PH corresponding to a difference between the required transmit power and the maximum transmit power, and determines virtual PH by using the actual PH, the number of RBs allocated to the UE, and the MCS level. Further, the analyzer 615 determines whether to trigger a PHR by using a PH threshold and the virtual PH. When the trigger condition is satisfied, the analyzer 615 instructs a logger 620 to log PHR-related report information. If a connection to the eNB 605 is available and the time to report the logged information is determined, the transceiver 610 receives the PHR-related report information from the logger 620, and transmits the received PHR-related report information to the eNB 605. Here, the analyzer 615 and the logger 620 may be implemented by one controller.

[Embodiment 3]

In the first and second exemplary embodiments of the present invention, a PHR is performed assuming a case where a UE is allocated RBs and an MCS from an eNB in order to actually transmit data. However, in some MDT use cases, a UE may be located outside of the coverage of the eNB. In such a case, it is impossible for a UE to be allocated radio resources from an eNB and transmit data by using the allocated radio resources. In other words, the first and second exemplary embodiments of the present invention cannot be performed by UEs located outside of coverage. Therefore, in the third exemplary embodiment of the present invention, a method is proposed to determine a PHR trigger on the assumption that a UE is allocated a predetermined number of RBs and a predetermined MCS.

It is assumed that a UE is allocated a number of RBs and an MCS that allows $10 \log_{10} M_{PUSCH} + \Delta_{TF}$ to have a constant value. Further, required UE transmit power is determined by measuring channel conditions currently experienced by a UE. The UE transmit power can be represented by Equation (1).

In determining the UE transmit power, a UE cannot measure the uplink path loss, but can derive it by measuring a downlink common channel. A UE derives PH from the UE transmit power determined in this way, and compares the derived PH with a PH threshold provided from an eNB. When the determined PH is less than the PH threshold, a UE triggers a PHR, and transmits PHR-related report information to an eNB. Here, the PHR-related measurement information presented in the conventional technique may be transmitted as the PHR-related report information, and an identifier bit for identifying the PHR from the existing PHR may be added in a message carrying the PHR-related report information or the PHR-related report information itself.

Figure 7:
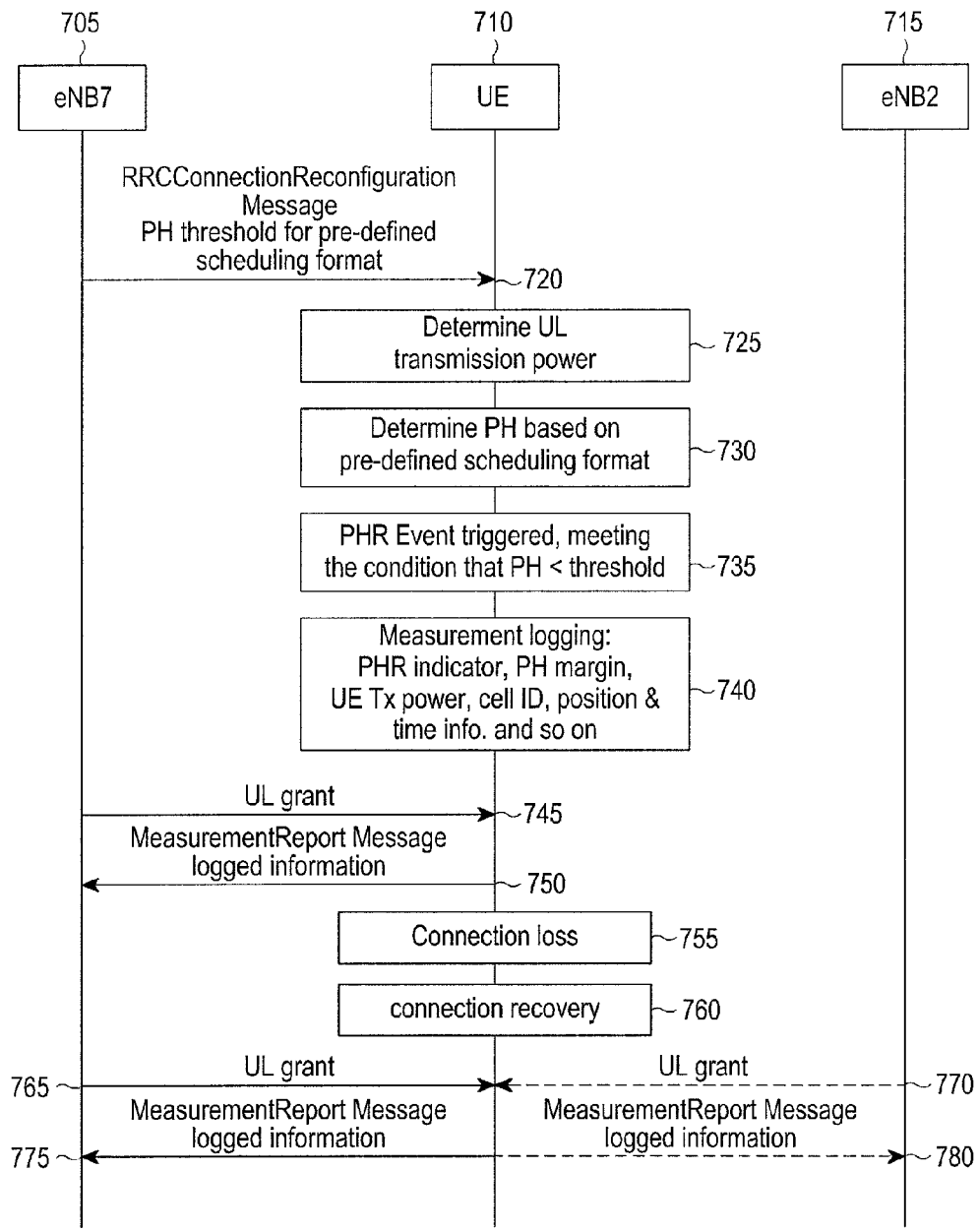
FIG. 7 is a flow diagram illustrating a method for reporting PH in a mobile communication system according to a third exemplary embodiment of the present invention.

FIG. 7 is a flow diagram illustrating a method for reporting PH in a mobile communication system according to the third exemplary embodiment of the present invention.

Referring to FIG. 7, in step 720, an eNB 705 transmits PHR-related configuration information to a UE 710. The PHR-related configuration information may be transmitted through an RRCConnectionReconfiguration message, which includes a PH threshold for a specific scheduling format. In step 725, the UE 710 determines UE uplink transmit power required for the specific scheduling format (that is, when it is assumed that a specific number of RBs and a specific MCS are given) by measuring the downlink path loss. In step 730, the UE 710 determines a PH value from a difference between its maximum transmit power and the uplink transmit power satisfying the predefined specific scheduling format. In step 735, the UE 710 monitors if the determined pH value is less than the PH threshold. When this condition is satisfied, the UE 710 logs the above-mentioned measurement information in PHR-related report information, and reports the PHR-related report information to the eNB 705 in step 740. When the UE 710 can immediately report the PHR-related report information to the eNB 705, it receives a UL grant from the eNB 705 in step 745, and transmits the corresponding PHR-related information to the eNB 705 over a PUSCH in step 750. The PHR-related report information may be transmitted through a MeasurementReport message, and it is also possible to consider reporting the PHR-related report information through the existing MAC CE. When the UE 710 cannot immediately report the PHR-related report information to the eNB 705 due to a connection loss in step 755, it may store the PHR-related report information until it is connected to the eNB 705 after a certain time elapses. Subsequently, if a connection to the eNB 705 is recovered in step 760, the UE 710 transmits the logged PHR-related report information to the eNB 705 in steps 765 and 775. Even when the UE 710 is connected to an eNB 715 other than the eNB 705 at the time to log the PHR-related report information, it may report the PHR-related report information to the eNB 715 in steps 770 and 780.

Since the PHR-related information list presented in the conventional technique includes the cell ID of a corresponding eNB, the cell ID may be used to deliver PHR-related report information to the corresponding eNB. That is, upon receiving the PHR-related report information, the eNB 715 may determine the cell ID and deliver the received PHR-related report information to the corresponding eNB 705.

Figure 8:
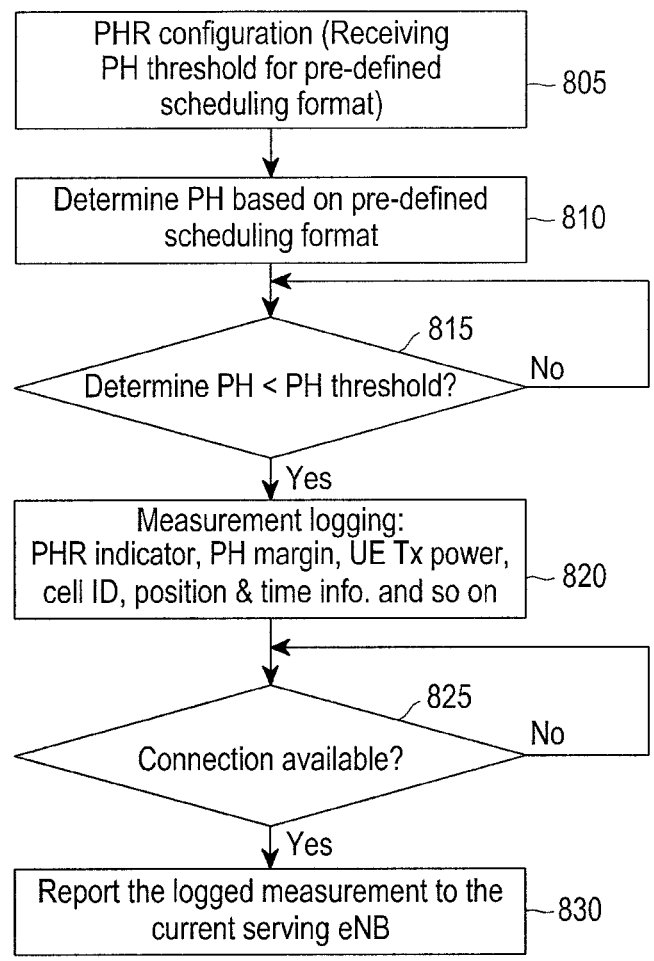
FIG. 8 is a flowchart illustrating a method for reporting PH in a mobile communication system according to the third exemplary embodiment of the present invention.

FIG. 8 is a flowchart illustrating a method for reporting PH in a mobile communication system UE according to the third exemplary embodiment of the present invention.

Referring to FIG. 8, in step 805, the UE receives PHR-related configuration information from an eNB. This information includes a PH threshold for a predefined specific scheduling format, and may be provided using an RRCConnectionReconfiguration message. In step 810, the UE derives uplink transmit power that can satisfy the specific scheduling format, and determines a PH value from a difference between its maximum transmit power and the uplink transmit power. In step 815, the UE monitors if the PH value is less than the PH threshold. When this condition is satisfied, the UE logs the above-mentioned measurement information in PHR-related report information, and reports the PHR-related report information to the eNB in step 820. Here, the measurement information may include an identifier bit for identifying the PHR from the existing PHR. Subsequently, the UE determines in step 825 if a connection to the eNB is available, and, when the connection is available, transmits the logged PHR-related to the current serving eNB in step 830.

Figure 9:
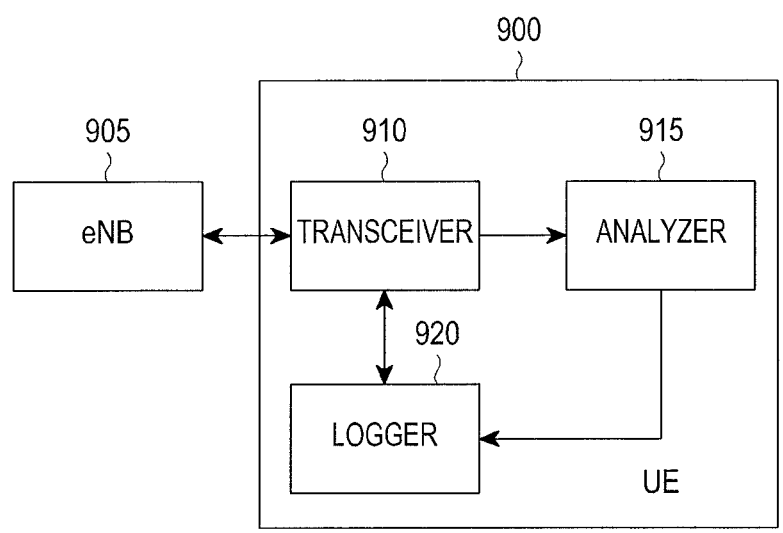
FIG. 9 is a block diagram illustrating a structure of a UE configured to perform a method reporting PH in a mobile communication system according to the third exemplary embodiment of the present invention.

FIG. 9 is a block diagram illustrating a structure of a UE configured to perform a method for reporting PH in a mobile communication system according to the third exemplary embodiment of the present invention.

Referring to FIG. 9, an eNB 905 transmits PHR-related configuration information to the UE 900. The UE 900 receives an RRCConnectionReconfiguration message including the PHR-related configuration information through a transceiver 910. Using the transceiver 910, the UE 900 infers an uplink path loss from a downlink common channel. An analyzer 915 receives the measured path loss value from the transceiver 910, and determines UE transmit power from the received path loss value. In addition, the analyzer 915 determines a PH value in a manner as described in FIGS. 7 and 8, and compares the determined PH value with a PH threshold to determine whether to trigger a PHR. When the trigger condition is satisfied, the analyzer 915 instructs a logger 920 to log PHR-related report information. An identifier for informing the eNB 905 whether or not the corresponding PHR is a PHR for a specific scheduling format may be included in a message carrying the PHR-related report information or the PHR-related report information itself. If a connection to the eNB 905 is available and the time to report the logged information is determined, the transceiver 910 receives the PHR-related report information from the logger 920, and transmits the received PHR-related report information to the eNB 905.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for reporting Power Headroom (PH) by a User Equipment (UE) in a mobile communication system, the method comprising:
   receiving Power Headroom Report (PHR) configuration information including a PH threshold from a first base station;
   determining whether to perform a PHR trigger by comparing a PH value indicating available transmit power of the UE with the PH threshold; and
   when the PH value is less than the PH threshold, transmitting PHR-related report information, including information corresponding to an influence caused by scheduling of the first base station, to the first base station,
   wherein whether to perform the PHR trigger is determined by using at least one of a number of Resource Blocks (RBs) allocated to the UE and a Modulation and Coding Scheme (MCS) level by scheduling of the first base station.

2. The method as claimed in claim 1, wherein the PHR configuration information includes the PH threshold and a filtering value for restricting the PHR trigger.

3. The method as claimed in claim 1, wherein the PHR-related report information further includes information for allowing the first base station to determine if the PHR trigger of the UE results from scheduling.

4. The method as claimed in claim 1, wherein the determining of whether to perform the PHR trigger comprises using a filtering value for filtering a PHR, a number of the RBs allocated to the UE, and a transmit power margin value additionally required for each MCS.

5. The method as claimed in claim 1, further comprising measuring the PH value.

6. The method as claimed in claim 1, wherein the PH value comprises a virtual PH that corresponds to the scheduling of the first base station.

7. The method as claimed in claim 6, wherein the virtual PH is determined using at least one of a PH measured by the UE, a number of the RBs allocated from the first base station, and the MCS level.

8. The method as claimed in claim 6, wherein the PHR configuration information further includes the PH threshold and information necessary for determination of the virtual PH.

9. The method as claimed in claim 1, wherein the PHR configuration information further includes a PHR threshold for a predefined specific scheduling format.

10. The method as claimed in claim 9, wherein the PH value is determined based on the predefined specific scheduling format.

11. The method as claimed in claim 1, further comprising transmitting the PHR-related report information to a second base station when the UE cannot immediately report the PHR-related report information to the first base station, wherein the PHR-related report information includes an identifier of the first base station.

12. A User Equipment (UE) configured to report Power Headroom (PH) to a first base station in a mobile communication system, the UE comprising:
   a receiver for receiving Power Headroom Report (PHR) configuration information including a PH threshold from the first base station;
   a transmitter for transmitting PHR-related report information to the first base station; and
   a controller for determining whether to perform a PHR trigger by comparing a PH value indicating available transmit power of the UE with the PH threshold, and for controlling transmitting the PHR-related report information, including information corresponding to an influence caused by scheduling of the first base station, to the first base station when the PH value is less than the PH threshold,
   wherein whether to perform the PHR trigger is determined based on at least one of a number of Resource Blocks (RBs) and a Modulation and Coding Scheme (MCS) level by scheduling of the first base station.

13. The UE as claimed in claim 12, wherein the PHR configuration information includes the PH threshold and a filtering value for restricting the PHR trigger.

14. The UE as claimed in claim 12, wherein the PHR-related report information further includes information for allowing the first base station to determine if the PHR trigger of the UE results from scheduling.

15. The UE as claimed in claim 12, wherein the controller determines whether to perform the PHR trigger by using a filtering value for filtering a PHR, a number of the RBs allocated to the UE, and a transmit power margin value additionally required for each MCS.

16. The UE as claimed in claim 12, wherein the controller controls measuring of the PH value.

17. The UE as claimed in claim 12, wherein the PH value comprises a virtual PH that corresponds to the scheduling of the first base station.

18. The UE as claimed in claim 17, wherein the virtual PH is determined using at least one of a PH measured by the UE, a number of RBs allocated from the first base station, and the MCS level.

19. The UE as claimed in claim 18, wherein the PHR configuration information further includes the PH threshold and information necessary for determination of the virtual PH.

20. The UE as claimed in claim 12, wherein the PHR configuration information further includes a PHR threshold for a predefined specific scheduling format.

21. The UE as claimed in claim 20, wherein the PH value is determined based on the predefined specific scheduling format.

22. The UE as claimed in claim 12, wherein the controller performs control such that the UE transmits the PHR-related report information to a second base station when the UE cannot immediately report the PHR-related report information to the first base station, wherein the PHR-related report information includes an identifier of the first base station.

* * * * *